(12) United States Patent
Olsson et al.

(10) Patent No.: US 10,770,926 B2
(45) Date of Patent: Sep. 8, 2020

(54) VEHICLE HAVING A REMOTE DEVICE POWERED BY AN ENERGY BEAM

(71) Applicant: LaserMotive, Inc., Kent, WA (US)

(72) Inventors: Claes Olsson, Kirkland, WA (US); Thomas J. Nugent, Jr., Bellevue, WA (US)

(73) Assignee: LASERMOTIVE, INC., Kent, WA (US)

( * ) Notice: Subject to any disclaimer, the term of this patent is extended or adjusted under 35 U.S.C. 154(b) by 0 days.

(21) Appl. No.: 16/445,600

(22) Filed: Jun. 19, 2019

(65) Prior Publication Data

US 2019/0305607 A1 Oct. 3, 2019

Related U.S. Application Data

(62) Division of application No. 15/234,789, filed on Aug. 11, 2016, now Pat. No. 10,374,466.

(Continued)

(51) Int. Cl.
*H02J 50/30* (2016.01)
*B60L 1/02* (2006.01)
(Continued)

(52) U.S. Cl.
CPC ............. *H02J 50/30* (2016.02); *B60L 1/02* (2013.01); *H02J 50/20* (2016.02); *B60L 9/00* (2013.01);
(Continued)

(58) Field of Classification Search
CPC .. H02J 50/30; H02J 50/20; H02J 50/10; H02J 50/12; H02J 7/025; B60L 1/02;
(Continued)

(56) References Cited

U.S. PATENT DOCUMENTS 6,534,705 B2 * 3/2003 Berrios ............... H02J 7/35
136/243
6,694,228 B2 * 2/2004 Rios .................. G05D 1/0044
244/17.13

(Continued)

OTHER PUBLICATIONS

Nugent et al., "Laser power beaming for defense and security applications," LaserMotive Informational Brochure, retrieved from URL=http://lasermotive.com/wp-content/uploads/2010/04/LaserMotive-SPIE_DSS11.pdf, 2010, 8 pages.

(Continued)

*Primary Examiner* — Jared Fureman
*Assistant Examiner* — Michael J Warmflash
(74) *Attorney, Agent, or Firm* — Seed IP Law Group LLP

(57) ABSTRACT

A commercially available vehicle is modified by coupling a beamed-power transmission system to the vehicle's frame. The beamed-power transmission system is arranged to deliver beamed power to a remote device such as an unmanned aerial vehicle (i.e., UAV or drone). The cooling system of the vehicle is used to cool portions of the beamed-power transmission system. An aiming system aims a power beam produced by the beamed-power transmitter toward the remote device, and a stability system coupled to both the vehicle frame and the beamed-power transmission system maintains three-dimensional constancy of the power beam even when the vehicle frame is in motion. The commercially available vehicle may be an electric vehicle, a gas-electric hybrid vehicle, or the like having a power source that includes batteries, a fuel-cells, or a generator.

15 Claims, 4 Drawing Sheets

Related U.S. Application Data

(60) Provisional application No. 62/205,503, filed on Aug. 14, 2015.

(51) Int. Cl.
*H02J 50/20* (2016.01)
*B60L 9/00* (2019.01)
*H02J 7/02* (2016.01)
*H02J 50/10* (2016.01)
*H02J 50/12* (2016.01)
*B60L 50/15* (2019.01)

(52) U.S. Cl.
CPC ........... *B60L 50/15* (2019.02); *B60L 2200/10* (2013.01); *B60L 2200/40* (2013.01); *H02J 7/025* (2013.01); *H02J 50/10* (2016.02); *H02J 50/12* (2016.02); *Y02T 10/7077* (2013.01)

(58) Field of Classification Search
CPC .. B60L 2200/10; B60L 2200/40; B60L 11/12; B60L 9/00; Y02T 10/7077
See application file for complete search history.

(56) References Cited

U.S. PATENT DOCUMENTS

| | | | |
|---|---|---|---|
| 6,792,259 B1* | 9/2004 | Parise | H02J 50/40 455/343.1 |
| 6,955,324 B2* | 10/2005 | Tanielian | B64C 39/024 244/3.13 |
| 7,068,991 B2* | 6/2006 | Parise | B01F 5/0614 455/343.1 |
| 7,548,697 B2* | 6/2009 | Hudson | A63H 30/04 398/106 |
| 8,511,606 B1* | 8/2013 | Lutke | B64C 39/028 244/100 R |
| 9,800,091 B2 | 10/2017 | Nugent, Jr. et al. | |
| 9,838,143 B2 | 12/2017 | Chan et al. | |
| 9,912,379 B2 | 3/2018 | Hyde et al. | |
| 2005/0096800 A1* | 5/2005 | Tanielian | B64C 39/024 701/2 |
| 2007/0200027 A1* | 8/2007 | Johnson | B64C 39/022 244/3.1 |
| 2010/0076634 A1 | 3/2010 | Brigham | |
| 2011/0266995 A1* | 11/2011 | Winfield | H02J 50/30 320/103 |
| 2012/0150364 A1* | 6/2012 | Tillotson | G05D 1/101 701/3 |

OTHER PUBLICATIONS

Nugent et al., "Laser Power for UAVs," LaserMotive White Paper, retrieved from URL=http://lasermotive.com/wp-content/uploads/2010/04/Wireless-Power-for-UAVs-March2010.PDF, 2010, 9 pages.

* cited by examiner

VEHICLE HAVING A REMOTE DEVICE POWERED BY AN ENERGY BEAM

BACKGROUND

Technical Field

The present disclosure generally relates to a mobile platform having an integrated power beaming system. More particularly, but not exclusively, the present disclosure relates to a high power, energy efficient motor vehicle with an integrated power beaming transmitter arranged to remotely power a device such as an unmanned aerial vehicle (UAV).

Description of the Related Art

Laser or microwave power beaming delivers electromagnetic energy from a transmitter to a receiver through the atmosphere over large distances (e.g., one or more meters to many hundreds or thousands of kilometers). At the receiver, the electromagnetic energy is converted to heat or electric power and used by an unmanned aerial vehicle (i.e., UAV or drone), ground vehicle, robot, tool, construction equipment, or other like machine.

Power beaming provides a source of heat or power without a physical conduit (e.g., wiring) attached to the receiving device. The efficiency of power beaming systems is limited, and power beaming systems typically require substantial electric power and, in many cases, cooling, at the transmitter.

In contrast, other power systems (e.g., direct power systems) provide a source of power with a physical conduit (e.g., wiring) attached to the receiving device. The efficiency of direct power systems may be limited in different ways based on the distance between a power-consuming device and a power source. Generally, the power source is fixed in one location.

All of the subject matter discussed in the Background section is not necessarily prior art and should not be assumed to be prior art merely as a result of its discussion in the Background section. Along these lines, any recognition of problems in the prior art discussed in the Background section or associated with such subject matter should not be treated as prior art unless expressly stated to be prior art. Instead, the discussion of any subject matter in the Background section should be treated as part of the inventor's approach to the particular problem, which in and of itself may also be inventive.

BRIEF SUMMARY

In accordance with some embodiments described herein, an energy efficient vehicle, such as an electric or hybrid vehicle, is configured with a laser or microwave beamed-power transmitter. The transmitter is powered by the electric or hybrid vehicle's electric supply (e.g., battery or fuel cell or generator). In some embodiments, the transmitter is cooled by a vehicle cooling subsystem such as a passenger air conditioner or battery cooling system. The transmitter in some embodiments may further share other subsystems with the vehicle, including power converters and controllers, location services (e.g., global position system (GPS)), security mechanisms, proximity detection, computer processing and displays, and communications.

An embodiment described in the present disclosure is a system that includes a vehicle, the vehicle having a frame, and a drive system coupled to the frame. The drive system is arranged to propel the vehicle. The system also includes a beamed-power transmission system coupled to the frame, which is arranged to deliver beamed power to a remote device. A cooling system is provided to cool portions of the beamed-power transmission system, an aiming system is operable to aim a power beam produced by the beamed-power transmission system toward the remote device, and a stability system is coupled to the frame and coupled to the beamed-power transmission system. The stability system is arranged to maintain substantial three-dimensional constancy of the power beam despite transience in the frame. An energy efficient power source is coupled to the vehicle and arranged to power the drive system, the beamed-power transmission system, the cooling system, the aiming system, and the stability system.

Another embodiment described in the present disclosure is a system that includes a remote device arranged to survey a geographical area and a vehicle. The vehicle has a frame, a drive system coupled to the frame and arranged to propel the vehicle, and a beamed-power transmission system coupled to the frame and arranged to deliver beamed power to the remote device. The vehicle also has an energy efficient power source coupled to the frame and arranged to power the drive system and the beamed-power transmission system. A local power interface is integrated with the vehicle and arranged to pass local power to the remote device when the remote device is proximate the vehicle, and a local docking interface is integrated with the vehicle and arranged to receive the remote device.

Yet one more embodiment described in the present disclosure is a method to power a remote device. The method includes operating a vehicle having a frame and a drive system coupled to the frame to propel the vehicle, operating an electrically powered remote device, and delivering beamed power to the electrically powered remote device via a beamed-power transmission system coupled to the frame.

Within the vehicle and power-beaming systems and methods discussed in the present disclosure, the innovation described in the present disclosure is new and useful, and the innovation is not well-known, routine, or conventional in the industry. The innovation described herein includes known building blocks combined in new and useful ways along with other structures and limitations to create something more than has heretofore been conventionally known. The embodiments improve on computing systems which, when un-programmed or differently programmed, cannot perform or provide the specific power-beaming features claimed herein.

To the extent that the present application describes computerized acts, the computerized acts described in the embodiments herein are not purely conventional and are not well understood. Instead, the acts are new to the industry. Furthermore, the combination of acts as described in conjunction with the present embodiments provides new information, motivation, and business results that are not already present when the acts are considered separately.

There is no prevailing, accepted definition for what constitutes an abstract idea. To the extent the concepts discussed in the present disclosure may be considered abstract, the claims present tangible, practical, and concrete applications of said allegedly abstract concepts.

The embodiments described herein apply computerized technology and other technologies to improve the technology of mobile power-beaming, but other techniques and tools remain available to wirelessly beam power. Therefore, the claimed subject matter does not foreclose the whole or even substantial portions of the power-beaming technological area.

These features with other objects and advantages, which will become subsequently apparent, reside in the details of construction and operation as more fully described hereafter and claimed, reference being had to the accompanying drawings forming a part hereof.

BRIEF DESCRIPTION OF THE SEVERAL VIEWS OF THE DRAWINGS

Non-limiting and non-exhaustive embodiments are described with reference to the following drawings, wherein like labels refer to like parts throughout the various views unless otherwise specified. The sizes and relative positions of elements in the drawings are not necessarily drawn to scale. For example, the shapes of various elements are selected, enlarged, and positioned to improve drawing legibility. The particular shapes of the elements as drawn have been selected for ease of recognition in the drawings. One or more embodiments are described hereinafter with reference to the accompanying drawings in which.

DETAILED DESCRIPTION

Figure 1:
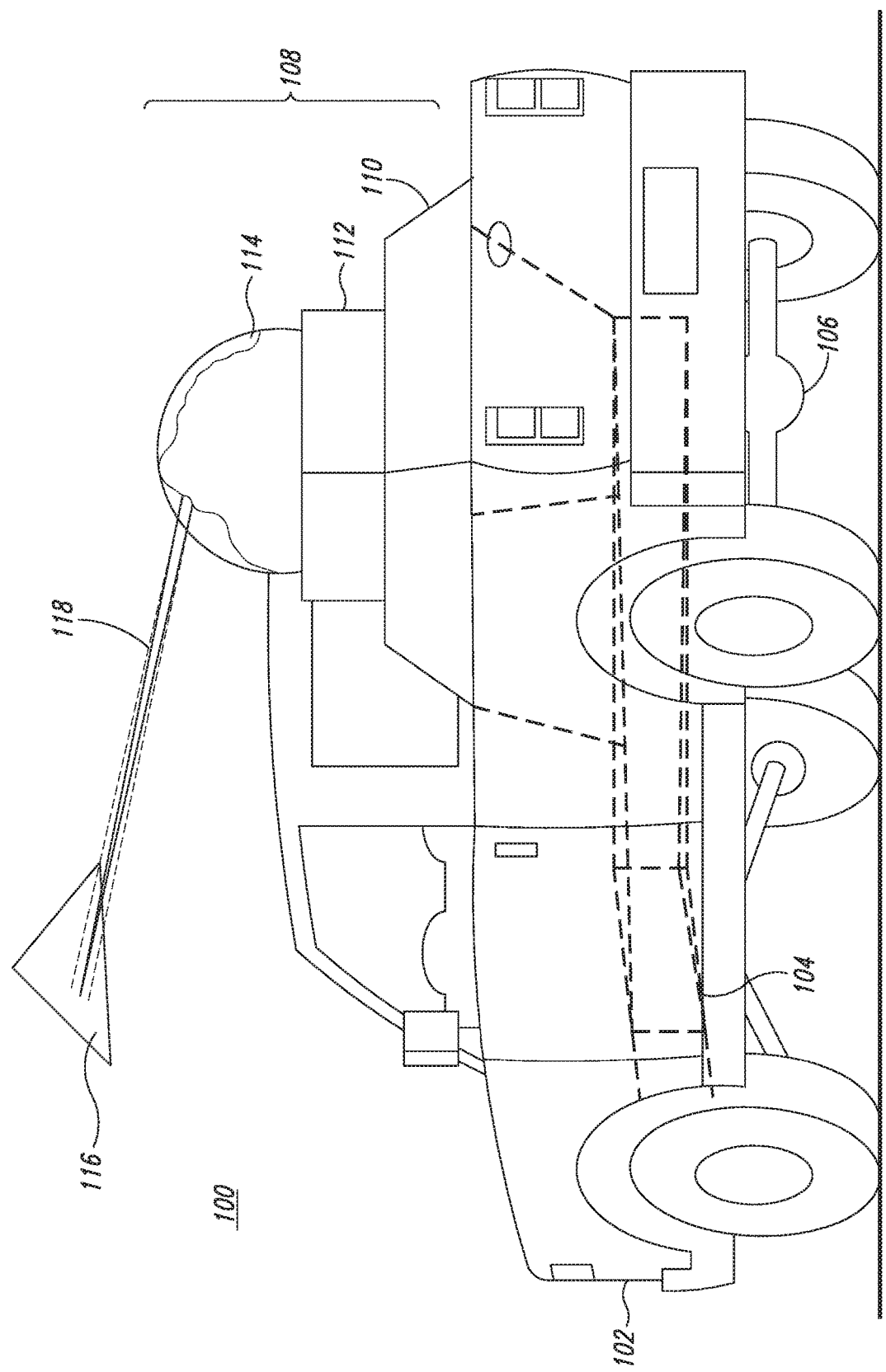
FIG. 1 is a commercially available, energy efficient vehicle embodiment modified with a beamed-power transmission system.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with computing systems including client and server computing systems, as well as networks have not been shown or described in detail to avoid unnecessarily obscuring descriptions of the embodiments.

Commercially available energy efficient motor vehicles include electric vehicles and hybrid vehicles. Typically, a hybrid vehicle includes various combinations of batteries, a combustion engine, and one or more fuel cells. An electric vehicle also includes one or more batteries, fuel cells, other chemical reaction-based power sources, but such vehicle is absent a combustion engine. A drive system is coupled to the frame of an energy efficient vehicle, and the drive system propels the vehicle. The drive system receives power from the battery, fuel cell, or other power source that is onboard the energy efficient vehicle. In the case of a hybrid vehicle, the onboard combustion engine typically provides less power to propel the vehicle than the combustion engine of a non-hybrid vehicle.

One distinguishing characteristic of energy efficient vehicles is that they have electrical power systems capable of sourcing multiple kilowatts (i.e., 5 kW, 10 kW, 50 kW, or more) of power using, for example, an electric generator. The sourced power is often delivered as stable, direct current (DC), and the power can last for multiple hours. In alternative embodiments, the sourced power may be delivered as alternating current (AC) or the sourced power may include both AC and DC power. In contrast to an energy efficient vehicle, a conventional vehicle with a gasoline or diesel internal combustion engine generally has a much lower-power electrical system. The electrical system of a conventional vehicle will typically provide a few kilowatts of peak power to start the internal combustion engine, and later provide less than one kilowatt of sustained power for auxiliary functions (i.e., headlights, audio systems, and the like).

The power produced by a commercially available energy efficient vehicle is available to power other electrically-powered equipment when the vehicle is not in motion. Alternatively, when the vehicle is in motion and operating at less-than-maximum load, substantial power may also be available.

In some embodiments discussed herein, power from an electric or other energy efficient vehicle is used to drive a power-beaming transmission system coupled to the vehicle (e.g., frame of the vehicle). The power-beaming transmission system includes a transmitter that generates a power beam, which is directed to a remote device. The power beam may be formed with a laser-based system or a microwave-based system. The power-beaming transmission system is configured to transmit electrical power to one or more remote devices within a line-of-sight vicinity of the vehicle.

In the present disclosure, a line-of-sight may be a direct point-to-point straight line path, or a line-of-sight may be an indirect path that includes reflections, refractions, or other paths and path segments that a power beam follows. Accordingly, a line of sight vicinity may include one or more intervening structures such as lenses that shape, aim, focus, or otherwise configure the power beam; mirrors that redirect the power beam; splitters that create multiple beams; or combiners that create a singular beam, and the like.

Various portions of the power-beaming transmission system are integrated with the energy efficient vehicle. For example, in one embodiment, some or all of the power-beaming transmission system is cooled by a vehicle cooling system. The cooling system may be an integral part of the energy efficient vehicle otherwise arranged to cool the occupants of the vehicle (i.e., the air conditioning system). In addition, or as an alternative, the cooling system may be integrally formed with the vehicle such that one or more portions of the cooling system are dedicated or otherwise arranged to cool the vehicle battery pack, power electronics, an electric motor, or some other system of the vehicle. In some energy efficient vehicles, a low-temperature cooling system, beyond that generally needed for cabin air conditioning, is used to facilitate rapid battery charging. In some embodiments, the vehicle cooling system is configured to provide air, gas, liquid, or some other coolant to the power-beaming transmission system at temperatures of approximately 30 degrees Celsius (° C.) or below. In this way, the temperature of the power-beaming transmission system can be maintained at about room temperature or below.

In another exemplary embodiment, the energy efficient vehicle is modified to mount some or all of the power-beaming transmission system. A transmitter aperture may be mounted on the vehicle roof, mounted in a truck bed, or otherwise coupled to the frame of the vehicle. In some cases, a transmitter aperture is elevated such as via a boom. Elevating the point of power beam transmission is desirable in most power beaming applications for safety and for improved operation. The elevation allows the high-energy power beam to originate above the heads of nearby personnel and over nearby obstacles.

In many cases, a parked vehicle provides a sufficiently stable mounting platform with a comparatively wide base. In some embodiments, the vehicle may be equipped with jacks or other stabilizing mechanisms to remove the flexibility of the normal vehicle suspension. Such mechanisms also provide a wider base and reduce vibrations and other motion passed into the power-beaming transmission system due to wind or other external stresses.

In some embodiments, a power-beaming transmission system may be coupled to a conventional internal combustion engine powered vehicle. In order to provide sufficient power for the power-beaming transmission system, the conventional vehicle may be equipped with a large generator. The large generator is typically driven by the internal combustion engine. It is recognized that one advantage provided by an energy efficient vehicle over a conventional combustion engine-powered vehicle with the large generator is that the energy efficient vehicle does not vibrate in the same way that an internal combustion engine vibrates. Thus, the energy efficient vehicle can operate a power-beaming transmission system mounted on the vehicle without having engine-induced vibration to disturb internal optics, beam pointing (i.e., aiming), or other aspects of the power-beaming transmission system.

In other embodiments, the power-beaming transmission system may use vehicle power electronics to provide controlled power in a desired format (i.e., voltage, current, frequency, phase, and the like). Typically, energy efficient vehicle power electronics are optimized to drive the electric motor of the vehicle. In addition, the power electronics may also be configured to convert a battery or other power source output into a regulated power supply at any desirable voltage, current, frequency, phase, or other parameter.

A power-beaming transmission system in some cases makes use of a vehicle navigation system to determine its own position and orientation. While navigation systems are not limited to energy efficient vehicles, many such vehicles have high quality navigation systems using GPS or other satellite positioning systems. In some cases, these navigation systems or other systems that facilitate operation of the power-beaming transmission system are calibrated by or extended by other vehicle-based means such as cameras, wheel sensors, or with other mechanisms.

The power-beaming transmission system may make use of other systems integrated into the energy efficient vehicle such as embedded computing systems, display systems, and communication systems. For example, the power-beaming transmission system may use the vehicle's computer and display for system control. The power-beaming transmission system may use the vehicle's communications devices (e.g., Bluetooth, WiFi, cellular, AM/FM antennas, and the like) or components thereof to communicate with a transceiver of the remote device.

In yet one more embodiment, the power-beaming transmission system may use one or more sensors integrated with the energy efficient vehicle. For example, if the vehicle is equipped with proximity sensors, such as ultrasonic sensors, the power-beaming transmission system may use the sensors as part of a wireless power link safety system. In this way, when a person, a vehicle, or some other object encroaches on or crosses into a defined hazard zone around the power-beaming transmission system, appropriate warnings may be enabled and appropriate action may be taken to improve safety and reliability of the system.

In addition to these shared systems and subsystems, the energy efficient vehicle may be further configured to provide dedicated storage and protection for power-beaming transmission system components when they are not in use. A transmitter beam projector, for example, may be enclosed by a hard shell. Alternatively, or in addition, the transmitter beam projector may be removable from the vehicle roof or other location for storage in a suitable compartment inside the vehicle. Storage for receivers and associated equipment such as UAVs, power converters, and other devices may also be provided. Other features associated with the beam-powered equipment may also be integrated with the vehicle, such as launchers, landing zones, or other mechanisms that facilitate beam-powered remote devices such as UAVs.

FIG. 1 is a commercially available, energy efficient vehicle embodiment modified with a beamed-power transmission system 100. In the embodiment, the vehicle 102 is a commercially available energy efficient vehicle. The vehicle 102 may be an electric vehicle, a hybrid vehicle, a fuel-cell powered vehicle, or a vehicle powered by another energy efficient technology.

The vehicle 102 is built around a frame 104 and propelled with a drive system 106. A beamed-power transmission system 108 is coupled to the frame 104. In the embodiment of FIG. 1, the beamed-power transmission system 108 is located in the bed of a pickup truck, but other embodiments are contemplated. For example, instead of a pickup truck, the vehicle 102 may be another type of automobile or utility vehicle. The vehicle 102 may include four wheels, as shown, or the vehicle 102 may include a different number of wheels, tracks, or some other apparatus to propel the vehicle. In addition, the beamed-power transmission system 108 may be coupled directly to the frame 104 or otherwise coupled to the frame via the roof of the vehicle 102, the hood of the vehicle 102, or via some other portion.

The beamed-power transmission system 108 includes a stability system 110, a control system 112, and a transmitter system 114.

The stability system 110 may include a concentric gimbal system, a flexible rubber standoff system, or some other system. The stability system is configured to maintain substantial three-dimensional constancy of a power beam despite transience, motor or propulsion system vibration, or some other type of motion in the frame. In one example, motion may come from wind or other natural and man-made forces. In other examples, such as when the vehicle 102 is being driven, motion may come from the lateral movement of the vehicle 102 as well as inclines, bumps, holes, and the like.

The control system 112 of the beamed-power transmission system 108 operates to direct the generation of the power beam. The control system 112 may be dedicated to the beamed-power transmission system 108 in some embodiments. In other embodiments, the control system is shared with the vehicle 102. A cooling system may be integrated with the control system 112. The cooling system is arranged to cool portions of the beamed-power transmission system 108. In some cases, the cooling system is implemented or otherwise integrated with a cooling system of the vehicle 102.

The transmitter system 114 optionally includes some or all of beam generation structures, beam forming structures, beam control structures, and beam aiming structures. A power beam produced by the transmitter may be a laser beam, a microwave beam, or a beam formed of another electromagnetic energy. The transmitter may include a tracking system that cooperates with a remote device when the power beam is directed toward the remote device. In this way, the remote device may provide feedback to the beamed-power transmission system 108 to better aim the power beam. The aiming system may include an electronic waveguide, a mechanical waveguide, an electromechanical waveguide or some other system to direct the power beam in a desired direction.

Figure 2:
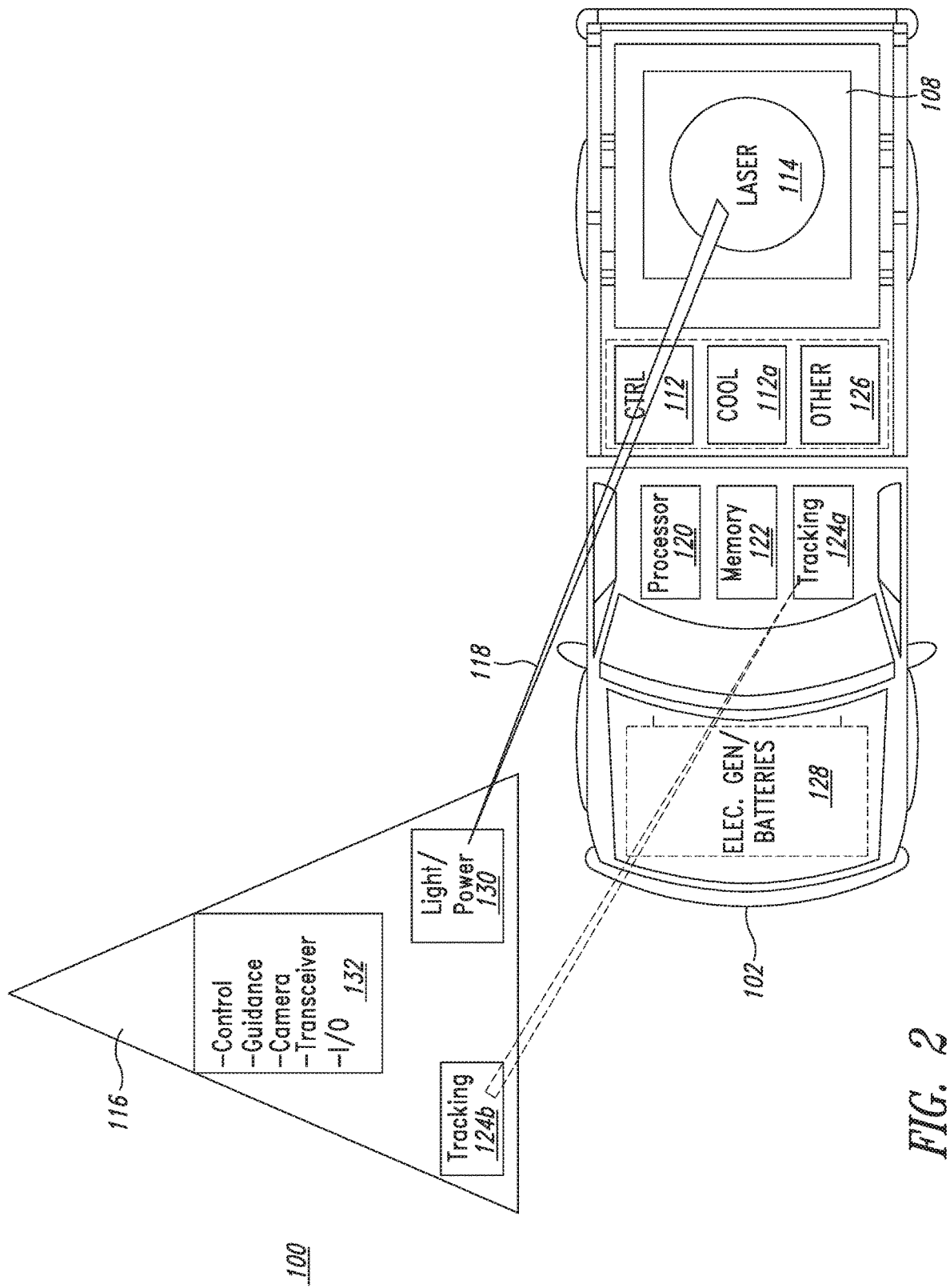
FIG. 2 is another commercially available, energy efficient vehicle embodiment modified with a beamed-power transmission system.

In FIG. 1, a remote device 116 is an unmanned aerial vehicle (UAV). The UAV may also be referred to interchangeably as a drone, a remote controlled vehicle, or by another like name. The remote device 116 in some cases is not a drone at all. Instead, the remote device may be a robot, a tool, a piece of industrial equipment, a sign, a communications structure, a building, or any other device configured to receive power via a power beam 118. The remote device 116 may be arranged to survey a geographic area, the remote device 116 may be arranged to provide central power in a dangerous environment or an area that is difficult to access, or the remote device 116 may be arranged in another location for another purpose, FIG. 2 is another embodiment of the commercially available, energy efficient vehicle modified with a beamed-power transmission system 100. Like features of FIG. 1 are illustrated in FIG. 2 as having the same reference numbers.

In FIG. 2, the beamed-power transmission system 108 is illustrated as formed with several components including the control system 112, the cooling system 112a, a processor 120, a memory 122, a tracking system 124a, and other control or data functions 126. The processor 120 is configured to control the operations of the beamed-power transmission system 108 via executable instructions and data stored in memory 122. The tracking function 124a in the vehicle 102 cooperates with a tracking function 124b of the remote device 116.

The vehicle 102 includes an energy efficient power source 128. The energy efficient power source 128 is coupled to the vehicle and arranged to power the drive system 106, the beamed-power transmission system 108, the cooling system 112a, the aiming system 112, the stability system 110, and other systems of embodiment. The energy efficient power source 128 energy efficient power source includes at least one of a battery, a fuel cell, a generator, or some other power source.

The remote device 116 includes a receiver 130, a tracking function 124b, and a plurality of other functions 132. The receiver 130, which may include a photovoltaic device, for example, is arranged to receive the power beam 118 and convert the received energy into a source of power for the remote device 116. Cooperatively, the tracking function 124b of the remote device 116 provides feedback to the beamed-power transmission system 108. The feedback is used by the beamed-power transmission system 108 to ensure or otherwise improve the chance that the power beam maintains a direct or indirect line-of-sight between the vehicle 102 and the remote device 116. In some cases, ensuring the line of sight includes circumstances where the power beam 118 loses "contact" with the receiver 130 and re-gains "contact" with the receiver 130. In these cases, "contact" is recognized as those points in time when transmission of the power beam 118 is received by the receiver 130 and the receiver is able to generate power from the received power beam 118.

In one embodiment, a civil enforcement agency such as a municipal police department is responsible to maintain civil order in a city. Recent events in society have inspired people to protest in the city. The police department wishes to monitor the protestors from a distance without interfering with the protest activities. At the same time, the police department recognizes a need to act quickly if certain ones of the protestors turn violent or otherwise break the law.

In these circumstances, the police department would like to remotely pilot an unmanned aircraft (i.e., a drone) over the site of the protest to remotely survey a particular geographic area. Since a conventional drone is only equipped to stay aloft for short periods of time, the police department configures a remote device drone 116 with a receiver 130. A vehicle 102 is equipped with a beamed-power transmission system 108 to transmit a power beam 118 to the drone 116. The power beam 118 enables the drone 116 to stay aloft for a long period of time which may be hours, days, weeks, or longer. In addition to the receiver 130, the drone 116 is equipped with other functions 132 including a guidance system, a camera, communication transmission devices, and other features. These functions cooperate with the beamed-power transmission system 108 and other control and data functions 126 of the vehicle 102 to permit the police personnel to monitor the protest.

Figure 3:
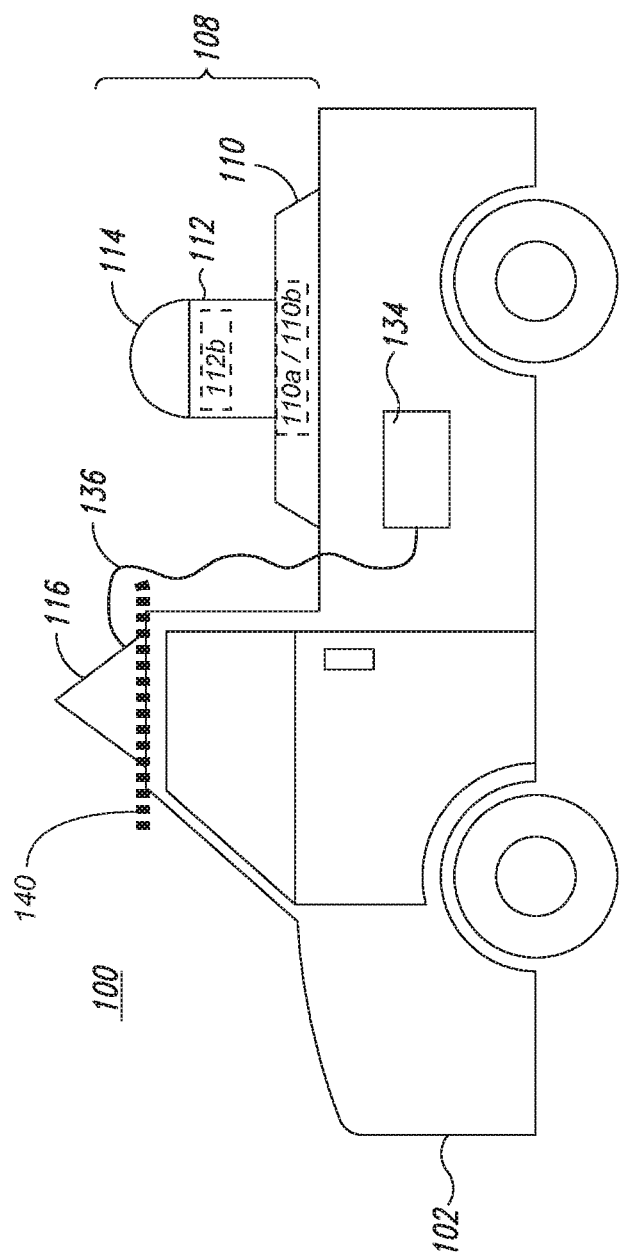
FIG. 3 is another commercially available, energy efficient vehicle embodiment modified with a beamed-power transmission system.

FIG. 3 is another embodiment of the commercially available, energy efficient vehicle modified with a beamed-power transmission system 100. Like features of FIGS. 1 and 2 are illustrated in FIG. 3 as having the same reference numbers. In FIG. 3, multiple methods and systems to recharge a remote device 116 are represented. In a first method, power is beamed over a long distance to the remote device via transmitter system 114. In a second method, power is transferred to the remote device over a short distance via a secondary power system 134. The secondary power system 134 may be formed as a local power interface used to recharge or power the remote device 116 during operation when remote device 116 is onboard or in close proximity to the vehicle 102.

In one embodiment, in association with the remote device 116 receiving power from the power beam 118, the remote device 116 is configured to track the vehicle 102 via the power beam 118, a laser beam, a radio signal, an optical feature, or by some other mechanism. In this way, the remote device 116 has information representing the position of the vehicle 102 when the remote device 116 is being powered by the power beam 118. In an alternative embodiment, the remote device 116 may track the position of the vehicle by a global positioning system (GPS), a Bluetooth signal, a WiFi signal, a cellular signal, or by some other radio frequency or non-radio frequency tracking technique altogether.

The remote device 102 may in some cases be configured with a recall function. The recall function directs a remote device (e.g., an unmanned aerial vehicle (UAV), a drone, a copter, a rover, a robot, and the like) to return to a power source. The recall function may be initiated at the remote device 116 (e.g., when a drone detects interference, unauthorized access, a current or impending malfunction, or for some other reason). The recall function may also be initiated by an operator of the remote device 116, an operator of the vehicle 102, the transmitter system 114, or by some other control mechanism.

After a recall function is activated, the remote device 116 may be arranged to track and use the power beam 118 or some other tracking mechanism to return to the source of the power beam 118. Upon returning to the power source, the remote device 116 may be taken out of service and, for example, placed on the vehicle 102 or in some other location (e.g., a fixed terminal, a crate, a storage locker, another vehicle, or in some other storage facility) for transport, recharging, and the like.

In the embodiment of FIG. 3, a local docking interface integrated with the vehicle 102 is arranged to receive the remote device 116, and secure the remote device 116 to the vehicle 102 for transportation, storage, and recharging when the remote device 116 is not in use. In the embodiment of FIG. 3, the remote device 116 is coupled to the roof of the vehicle 102 in a local docking interface, but other embodiments are contemplated. For example, the remote device 116 may instead be coupled to the side of the vehicle 102, the back of the vehicle 102, the front of the vehicle 102, underneath the vehicle 102, or some other location of the vehicle 102. The remote device 116 may be stored in some other manner, such as on the ground, or in or on something else altogether.

In the embodiment of FIG. 3, the remote device 116 is directly or indirectly coupled to a secondary power source 134 through a particular local power interface. The local power interface may be integrated with the vehicle 102 and arranged to pass local power to the remote device 116 when the remote device 116 is proximate the vehicle 102. In some embodiments, the local power interface and the local docking interface are integrated into a single unit. For example, in some cases, the secondary power source 134 may be arranged as a local power interface combined into a single unit with the local docking interface, In these and in other cases, local power may be delivered to a remote device 116 when the local device is physically coupled to the vehicle 102 or in proximity to the vehicle 102.

The secondary power source 134 is illustrated as being onboard the vehicle 102, however, the secondary power source 134 may be in another location. The secondary power source 134 may be an electrically efficient power source such as energy efficient power source 128, or the secondary power source 134 may be some other power source altogether. For example, the onboard secondary power source 134 may be a battery, a fuel cell, a generator, or some other power source altogether. In some embodiments, the secondary power source 134 and the energy efficient power source 128 are the same power source. When the remote device 116 has returned to the vehicle 102 as in FIG. 3, the secondary power source 134 can recharge the remote device 116.

In FIG. 3, the remote device 116 is optionally coupled to the secondary power source 134 by a physical conduit 136. The physical conduit 136 may include electrically conductive wire, an electrical receiver, an electrical plug, or some other physical conduit altogether. After the remote device 116 is coupled to the secondary power source 134 through the physical conduit 136, the physical conduit 136 passes an electric charging signal from the secondary power source 134 to recharge the remote device 116.

In alternative embodiments, the remote device 116 may be charged by the transmitter system 114 or some other indirect charging device. For example, in optional embodiments of FIG. 3, a remote device 116 is charged while the remote device 116 is not physically wired to the vehicle 102. The break line 140 in FIG. 3 represents a non-physical electrical coupling between the remote device 116 and the vehicle 102 along with the secondary power source 134. For example, the break line 140 in FIG. 3 may represent a local docking interface, a wireless charging domain, or another close proximity power transfer mechanism. Recharging the remote device 116 can be accomplished through near-field wireless power technologies such as induction, resonance, and the like.

In some embodiments, the remote device 116 is charged by an induction-based charging technique. The remote device 116 may, for example, land on or otherwise be placed on an electrical wireless recharging device that is integrated with or otherwise coupled to the vehicle 102. For example, the electrical wireless recharging device may be a wireless charging pad, an inductive coupling, or some other induction charging technology. In such embodiments, the vehicle 102 could be moving while the remote device 116 is being charged, or the vehicle 102 could be stationary while the remote device 116 is being charged. In these and in other embodiments, the remote device 116 may also be stationary or moving while the remote device 116 is being charged, In other words, the vehicle 102 may pass sufficient power through an induction mechanism to recharge the remote device 116 while one or both of the remote device 116 and the vehicle 102 are either moving or stationary.

In other embodiments, the remote device 116 may be charged by a resonance-based charging technique. The remote device 116 may, for example, fly or be otherwise positioned in the vicinity of the vehicle 102. The vicinity may be within five (5) feet, within ten (10) feet, within fifteen (15) feet, or the vicinity may be some other distance. The resonance-based charging device is arranged to generate a resonance field. When the remote device 116 is placed in proximity to the vehicle 102, energy from the resonance field is transferred to charge the remote device 116. In these and in other cases, one or both of the remote device 116 and the vehicle 102 may be either moving or stationary when the remote device 116 is being charged.

In some cases, a plurality of remote devices 116 may be within the electrical influence of the resonance field. The resonance based charging device may be magnetic resonance or some other resonance-based charging technique. In these embodiments, resonance-based charging could be used to charge a remote device 116 instead of the transmitter system 114 when the remote device 116 is the vicinity of the vehicle 102.

In some cases where a remote device 116 is not physically wired to the vehicle 102 during a recharging event, the remote device 116 may not be in any physical contact with the vehicle 102. For example, when a vehicle 102 is arranged to perform secondary powering (e.g., recharging) of a remote device 116 via a near-field wireless power technique, the remote device 116 may be a drone that hovers over or near the vehicle 102, or the remote device 116 may be a robot or ground-traveling device that is alongside the vehicle 102. Other configurations are also contemplated.

Figure 4:
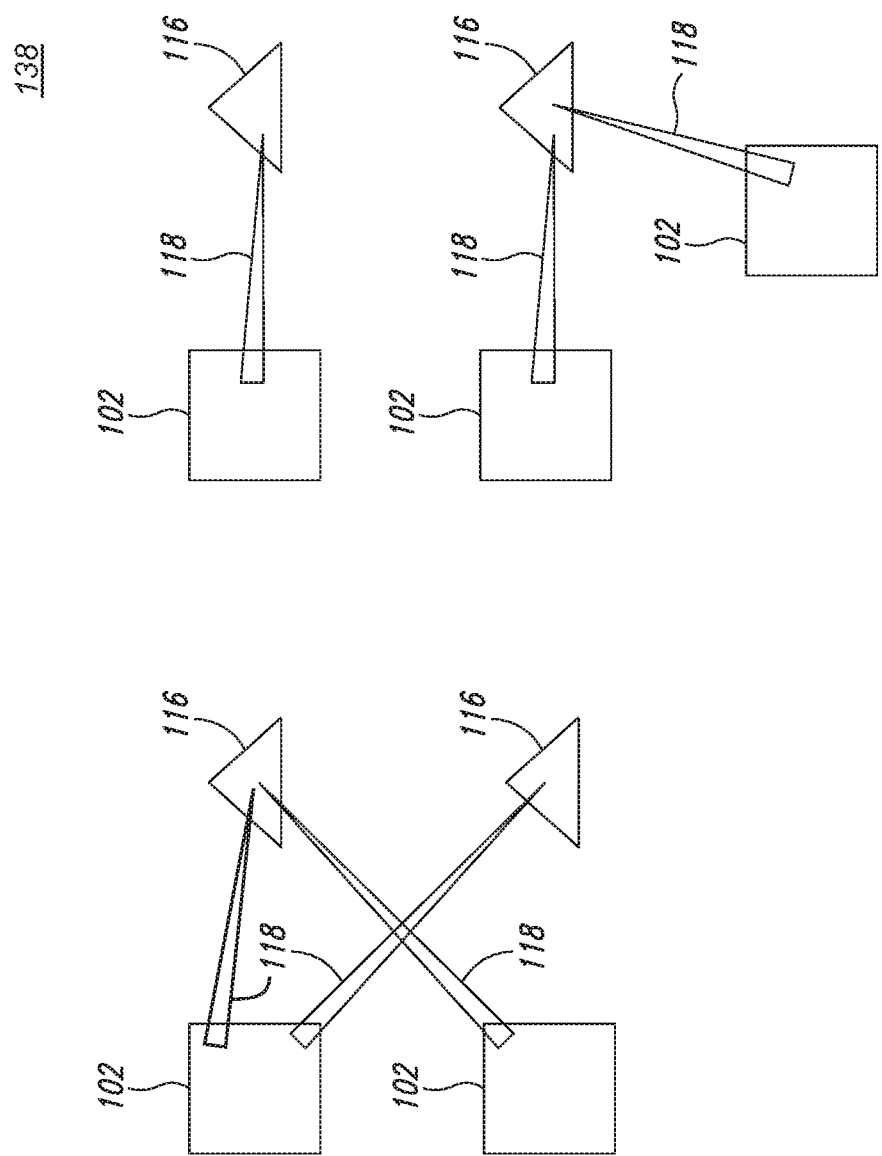
FIG. 4 is a vehicle network embodiment of multiple vehicles and multiple remote devices.

FIG. 4 is a vehicle network embodiment of multiple vehicles to power multiple remote devices. Like features of FIGS. 1-3 are illustrated in FIG. 4 as having the same reference numbers.

In FIG. 4, a plurality of vehicles 102 are used in a vehicle network 138 to power a plurality of remote devices 116. In the embodiment of FIG. 4, five vehicles 102 are illustrated to beam power to four remote devices 116, but other embodiments are contemplated. For example, instead of five vehicles 102, the vehicle network 138 may include six vehicles, eight vehicles, ten vehicles, or some other number of vehicles. Additionally, for example, instead of four remote devices 116 receiving power via the vehicle network 138, six, eight, and ten remote devices, or some other number of remote devices, which are powered by the vehicle network 138, have been contemplated. Also in some embodiments, as illustrated in FIG. 4, one vehicle 102 may optionally provide power to a plurality of remote devices 116. In other optional embodiments, as shown in FIG. 4, two vehicles 102 may provide power to a same remote device 116. For example, a selected plurality of vehicles 102 may be used to power a single remote device 116, and a selected number of one or more vehicles 102 may transfer power to a selected number of one or more remote devices 116.

Certain words and phrases used in the specification are set forth as follows. As used throughout this document, including the claims, the singular form "a", "an", and "the" include plural references unless indicated otherwise. For example, "a" battery includes one or more batteries. Any of the features and elements described herein may be singular, e.g., a sensor may refer to one sensor and a memory may refer to one memory. The terms "include" and "comprise," as well as derivatives thereof, mean inclusion without limitation. The term "or," is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation, such a device may be implemented in hardware, firmware, or software, or some combination of at least two of the same. The functionality associated with any particular controller may be centralized or distributed, whether locally or remotely. Other definitions of certain words and phrases are provided throughout this patent document. Those of ordinary skill in the art will understand that in many, if not most instances, such definitions apply to prior as well as future uses of such defined words and phrases.

As used in the present disclosure, the term "module" refers to an application specific integrated circuit (ASIC), an electronic circuit, a processor and a memory operative to execute one or more software or firmware programs, combinational logic circuitry, or other suitable components (hardware, software, or hardware and software) that provide the functionality described with respect to the module.

A processor (i.e., a processing unit), as used in the present disclosure, refers to one or more processing units individually, shared, or in a group, having one or more processing cores (e.g., execution units), including central processing units (CPUs), digital signal processors (DSPs), microprocessors, micro controllers, state machines, and the like that execute instructions. The processors interchangeably refer to any type of electronic control circuitry configured to execute programmed software instructions. The programmed instructions may be high-level software instructions, compiled software instructions, assembly-language software instructions, object code, binary code, micro-code, or the like. The programmed instructions may reside in internal or external memory or may be hard-coded as a state machine or set of control signals. According to methods and devices referenced herein, embodiments describe software executable by the processor and operable to execute certain ones of the method acts.

In the present disclosure, memory may be used in one configuration or another. As known by one skilled in the art, each memory comprises any combination of volatile and non-volatile, transitory and non-transitory computer-readable media for reading and writing. Volatile computer-readable media includes, for example, random access memory (RAM). Non-volatile computer-readable media includes, for example, read only memory (ROM), magnetic media such as a hard-disk, an optical disk drive, a flash memory device, a CD-ROM, and/or the like. In some cases, a particular memory is separated virtually or physically into separate areas, such as a first memory, a second memory, a third memory, and the like. In these cases, it is understood that the different divisions of memory may be in different devices or embodied in a single memory. The memory may be configured to store data. In the alternative or in addition, the memory may be a non-transitory computer readable medium (CRM) wherein the CRM is configured to store instructions executable by a processor. The instructions may be stored individually or as groups of instructions in files. The files may include functions, services, libraries, and the like. The files may include one or more computer programs or may be part of a larger computer program. Alternatively or in addition, each file may include data or other computational support material useful to carry out the computing functions of the systems, methods, and apparatus described in the present disclosure.

As used herein, "cellular" is intended in a broad sense to include any of the variety of known modes of wireless or mobile voice communications, data communications, or voice and data communications. Exemplary cellular systems include, but are not limited to, time division multiple access ("TDMA") systems, code division multiple access ("CDMA") systems, and Global System for Mobile communications ("GSM") systems. Other exemplary cellular systems include systems known in the art as "3G" systems, "4G" systems, "5G" systems, Enhanced Data Rates for GSM Evolution ("EDGE") systems, and other systems.

Beamed-power transmission system 108 may further include operative software found in a conventional embedded device such as an operating system, software drivers to direct operations through the I/O circuitry, networking circuitry, and other peripheral component circuitry. In addition, beamed-power transmission system 108 may include operative application software such as network software for communicating with other computing devices, database software for building and maintaining databases, and task management software for distributing the communication and/or operational workload amongst various CPU's. In some cases, beamed-power transmission system 108 is a single hardware device having the hardware and software listed herein, and in other cases, beamed-power transmission system 108 is a networked collection of discrete hardware and software devices working together to execute the functions of the dermal injector. The conventional hardware and software of intelligent lighting module control unit is not shown in the figures for simplicity.

Software stored in memory 122 may include a fully executable software program, a simple configuration data file, a link to additional directions, or any combination of known software types. When the beamed-power transmission system 108 updates software, the update may be small or large. For example, in some cases, beamed-power transmission system 108 downloads a small configuration data file, and in other cases, beamed-power transmission system 108 completely replaces all of the functional program instructions in memory 122 with a fresh version. In some cases, the software and data in memory 122 is encrypted, encoded, and/or otherwise compressed for reasons that include security, privacy, data transfer speed, data cost, or the like.

When so arranged as described herein, the beamed-power transmission system 108 is transformed from a generic and unspecific computing device to a combination device comprising hardware and software configured for a specific and particular purpose.

Where a range of values is provided, it is understood that each intervening value, to the tenth of the unit of the lower limit unless the context clearly dictates otherwise, between the upper and lower limit of that range and any other stated or intervening value in that stated range is encompassed within the invention. The upper and lower limits of these smaller ranges may independently be included in the smaller ranges is also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein.

Generally, unless otherwise indicated, the materials for making the invention and/or its components may be selected from appropriate materials such as metal, metallic alloys, semiconductors, ceramics, plastics, etc.

The various embodiments described above can be combined to provide further embodiments. Aspects of the embodiments can be modified, if necessary to employ concepts of the various patents, application and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system, comprising:
a remote device configured to survey a geographical area; and
a vehicle, the vehicle having:
a frame;
a drive system coupled to the frame, the drive system arranged to propel the vehicle;
a beamed-power transmission system coupled to the frame, the beamed-power transmission system arranged to deliver beamed power to the remote device;
an electrical energy efficient power source coupled to the frame, the electrical energy efficient power source configured to store electrical energy and arranged to power the drive system and the beamed-power transmission system, the drive system configured to propel the vehicle using power received from the electrical energy efficient power source;
a local power interface integrated with the vehicle and arranged to pass local power to the remote device when the remote device is proximate to the vehicle; and
a local docking interface integrated with the vehicle and arranged to receive the remote device.

2. The system of claim 1 wherein the local docking interface is arranged to physically secure the remote device to the vehicle when the remote device is not positioned remote from the vehicle.

3. The system of claim 2 wherein the local power interface and the local docking interface are integrated into a single unit.

4. The system of claim 1 wherein the beamed-power transmission system includes at least one transmitter of either a laser beam transmitter or a microwave beam transmitter.

5. The system of claim 1 wherein the local power interface includes at least one of an electrical wire, an electrical wireless charging pad, an electrical plug, and an electrical receiver.

6. The system of claim 1 wherein the remote device is an unmanned aerial vehicle arranged to receive power via a power beam.

7. The system of claim 1 wherein the remote device includes:
a receiver to receive the power beam and convert energy from the power beam into electric power consumable by the remote device; and
a tracking system to maintain line-of-sight between the vehicle and the remote device.

8. A system, comprising:
a remote device requiring electric power to operate; and
a vehicle, the vehicle having:
a frame;
a drive system coupled to the frame, the drive system arranged to propel the vehicle;
a beamed-power transmission system coupled to the frame, the beamed-power transmission system arranged to deliver beamed power to the remote device;
an electrical energy efficient power source coupled to the frame, the electrical energy efficient power source configured to store electrical energy and arranged to power the drive system and the beamed-power transmission system, the drive system configured to propel the vehicle using power received from the electrical energy efficient power source;
a local power interface integrated with the vehicle and arranged to pass local power to the remote device when the remote device is proximate to the vehicle; and
a local docking interface integrated with the vehicle and arranged to receive the remote device.

9. The system of claim 8, wherein the remote device is a remote self-propelled device requiring the electric power to propel itself.

10. The system of claim 9, wherein the remote self-propelled device includes:
a receiver to receive the power beam and convert energy from the power beam into electric power consumable by the remote self-propelled device; and
a tracking system to maintain line-of-sight between the vehicle and the remote self-propelled device.

11. The system of claim 10, wherein the tracking system is configured to transmit tracking feedback information to the beamed-power transmission system, the beamed-power transmission system configured to use the tracking feedback information to maintain the line-of-sight.

12. The system of claim 9, wherein the remote self-propelled device is configured to return automatically to the vehicle as a result of detecting one or more defined conditions.

13. A system, comprising:
a remote stationary device requiring electric power to operate; and
a vehicle, the vehicle having:
a frame;
a drive system coupled to the frame, the drive system arranged to propel the vehicle;

a beamed-power transmission system coupled to the frame, the beamed-power transmission system arranged to deliver beamed power to the remote stationary device;

an electrical energy efficient power source coupled to the frame, the electrical energy efficient power source configured to store electrical energy and arranged to power the drive system and the beamed-power transmission system, the drive system configured to propel the vehicle using power received from the electrical energy efficient power source; and a local power interface integrated with the vehicle and arranged to pass local power to the remote stationary device when the remote stationary device is proximate to the vehicle.

14. The system of claim 13, wherein the remote stationary device is selected from a device group comprising the following types of devices:
   a piece of industrial equipment;
   a communications structure; and
   a sign.

15. The system of claim 13, wherein the beamed-power transmission system includes at least one transmitter of either a laser beam transmitter or a microwave beam transmitter.

* * * * *